United States Patent [19]

Kosmal

[11] Patent Number: 5,734,110
[45] Date of Patent: Mar. 31, 1998

[54] TEMPERATURE COMPENSATED, EASILY INSTALLED BOLT-ON STRAIN SENSOR

[75] Inventor: Alfred J. Kosmal, Mt. Vernon, Wash.

[73] Assignee: Kistler-Morse Corporation, Bothell, Wash.

[21] Appl. No.: 731,342

[22] Filed: Oct. 11, 1996

[51] Int. Cl.⁶ .................................................. G01L 2/00
[52] U.S. Cl. ......................... 73/766; 73/862.632; 177/211
[58] Field of Search .............................. 73/774, 775, 766, 73/786, 790, 813, 862.632, 862.633; 177/211

[56] References Cited

U.S. PATENT DOCUMENTS

| | | | |
|---|---|---|---|
| 2,587,628 | 3/1952 | King | 73/766 X |
| 3,116,469 | 12/1963 | Wu | 73/766 X |
| 3,137,834 | 6/1964 | Pfann | 73/775 X |
| 3,853,000 | 12/1974 | Barnett et al. | 73/766 X |
| 3,894,592 | 7/1975 | Andersson et al. | 177/211 X |
| 4,332,174 | 6/1982 | Suzuki et al. | 73/862.633 |
| 4,747,456 | 5/1988 | Kitagawa et al. | 177/211 |
| 5,119,894 | 6/1992 | Crawford et al. | 177/211 X |
| 5,264,666 | 11/1993 | English et al. | 177/211 X |
| 5,313,022 | 5/1994 | Piroozmandi et al. | 177/211 |
| 5,539,158 | 7/1996 | Utsunomiya et al. | 177/211 |

*Primary Examiner*—Elizabeth L. Dougherty
*Attorney, Agent, or Firm*—Seed and Berry LLP

[57] ABSTRACT

A bolt-on strain sensor includes an L-shaped sensor body having a mounting hole formed at the end of each leg of the L-shaped body and a mounting hole formed at the intersection of the legs. A first strain sensing structure is formed in the sensor body between two of the mounting holes and a second strain sensing structure is formed in the sensor body between the other two mounting holes. The strain sensing structure is preferably a strain gauge instrumented measurement beam connected to the sensor body on opposite sides of the strain sensing region by spaced apart interconnecting members. A printed circuit board on which a plurality of electrical components are mounted is secured to the sensor body with a suitable fastener. A cover is then placed over the sensor body and printed circuit board.

17 Claims, 4 Drawing Sheets

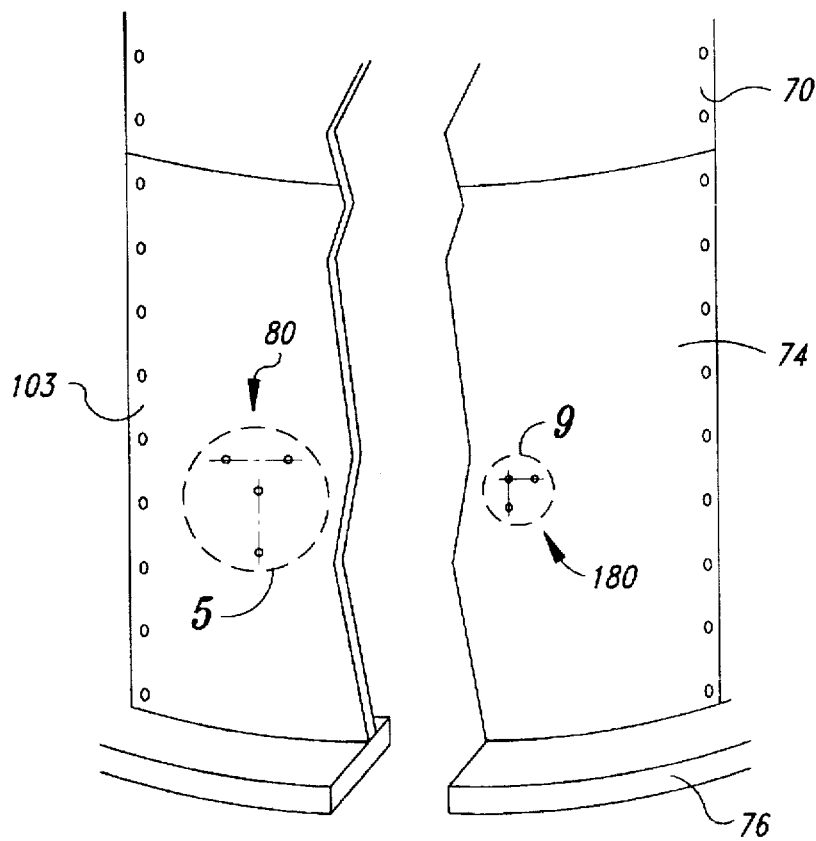
Fig. 4
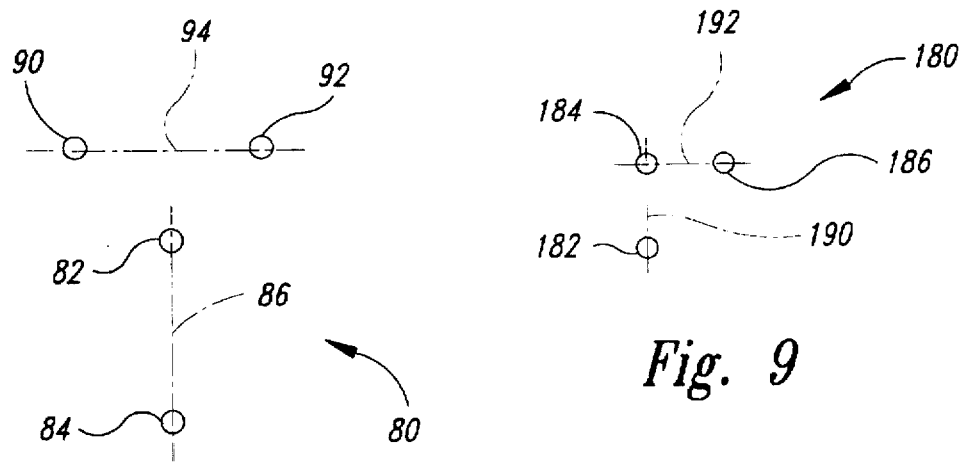
Fig. 5
Fig. 9

TEMPERATURE COMPENSATED, EASILY INSTALLED BOLT-ON STRAIN SENSOR

TECHNICAL FIELD

This invention relates to strain sensors for sensing forces and weights using strain sensors and, more particularly, to temperature compensation of bolt-on strain sensors.

BACKGROUND OF THE INVENTION

Several methods and technologies have been developed for measuring the contents of large silos or bins used to store bulk materials such as minerals, coal, plastics, chemicals and the like. One approach is to determine the material level in vessels through the use of mechanical devices or through ultrasonic sounding. Another method for measuring the contents of large silos involves weighing the contents of the vessels. These methods become difficult and impractical, however, when the contents are stored in large, tall silos or other similarly large vessels.

Recently, bolt-on weighing has become a popular approach for measuring the contents of vessels. This method consists of bolting strain sensors to the support structures of vessels. The contents of a vessel can be determined by monitoring the electrical output that is the direct result of strain measurements taken from one or more strain sensors coupled to the support structure of the vessel. By measuring the amount of axial strain in the support structure as material is added or removed from the vessel, the weight of the contents can be determined. The use of strain sensors to weigh the contents of vessels has several advantages over level sensing methods. First, the sensors are positioned on vessel support structures rather than inside vessels where the sensor may come in contact with the sometimes caustic or abrasive contents of vessels. Sensors can be damaged by being exposed to caustic or abrasive materials, particularly over a considerable period. In addition, bolt-on strain sensors require no cabling or instruments inside the vessel, and the sensors can be installed and serviced at ground level. One bolt-on weighing system commonly used today is described in U.S. Pat. No. 4,064,744, granted to Kistler.

Bolt-on strain sensors have long been used to measure forces and loads. However, problems have sometimes developed in utilizing bolt-on strain sensors in weighing applications. It has been found that bolt-on strain sensors can be adversely affected by variations in the temperature of the support structure and/or the sensor itself. In particular, it is difficult to make the sensor sensitive solely to the principal strain, i.e., the strain resulting solely from changes in stress induced by vessel loading and unloading. Instead, bolt-on sensors are sometimes excessively sensitive to strains (expansion and contraction) induced by changes in the temperature of the sensor or the support structure to which the sensor is bolted. For example, installing a single axis strain sensor on a silo support structure in the direction of the principal strain will provide information about the weight or level of material in the silo. This information will be in the form of an electrical output proportional to the stress change in the support structure. However, the sensor will also measure and provide an electrical output of the strain related to thermal changes, i.e., the expansion/contraction of the support structure independent of the principal strain associated with a load change. The sensor will also measure and provide an electrical output of the strain related to temperature transients which may cause differential expansion between the sensor and support structure. These temperature related output signals are considered to be highly undesirable signal errors. Typical industry "solutions" to this problem are to couple the output signals through a passive resistor temperature compensating network. Although passive resistor networks can minimize errors caused by temperature induced expansion/contraction of support structures, they cannot address temperature induced differential expansion of sensors relative to support structures.

Another approach to temperature compensating strain sensors is to install a pair of sensors on a support structure in a rosette pattern with the sensors arranged at right angles to each other. The electrical output of the vertical sensor is reversed as compared to the horizontal sensor so that, for example, the electrical output of the vertical sensor is positive for compression and negative for tension while the electrical output of the horizontal sensor is negative for compression and positive for tension. The vertical sensor is aligned with the principal strain so that the vertical sensor will be compressed when the load is increased. The horizontal sensor is at 90 degrees so that it will be tensioned in accordance with poissons ratio when the load is increased. The sensors are connected to each other so that the electrical output of the horizontal sensor is subtracted from the electrical output of the vertical sensor. As a result of the sensors' orientation and electrical connections, increasing loads cause the compressed vertical sensor to generate a positive signal which is added to the positive signal generated by the tensioned horizontal sensor. Conversely, decreasing loads cause the tensioned vertical sensor to generate a negative signal which is added to the negative signal generated by the compressed horizontal sensor. However, the vertical and horizontal sensors react equally to thermally induced strain. As a result, a decreasing temperature will compress both sensors causing the vertical sensor to generate a positive electrical output which is added to the negative electrical output from the horizontal sensor. Conversely, an increasing temperature will tension both sensors causing the vertical sensor to generate a negative electrical output which is added to the positive electrical output from the horizontal sensor. As a result of the rosette arrangement, the electrical outputs from the vertical and horizontal sensors cancel each other thus providing a high rejection rate of error signals caused by thermal effects.

Optimizing the sensors' insensitivity to thermal effects requires that the sensors be installed at precisely 90 degrees in relation to each other and as close to each other as possible so that they are both exposed to the same thermal changes. However, it is somewhat difficult and time consuming to precisely install strain sensors in a rosette pattern. Furthermore, it is difficult to ensure that respective sensors are exactly parallel and perpendicular to the principal strain, thus causing measurement inaccuracies that are difficult to detect. Further, because of the size of conventional bolt-on strain sensors, it may not be possible in some cases to install the strain sensors sufficiently close to each other so that they are exposed to the same thermal effects.

SUMMARY OF THE INVENTION

The inventive temperature compensated, easily installed bolt-on strain sensor includes a sensor body having first, second and third mounting holes. The first and second mounting holes are positioned along a first line and the second and third mounting holes are positioned along a second line that is perpendicular to the first line. The sensor body preferably has an L-shaped configuration, and the holes are preferably symmetrically positioned in respective legs. A first strain sensing element is mounted on the sensor body between the first and second mounting holes, and has an axis of sensitivity acting along the first line. A second strain sensing element is mounted on the sensor body between the second and third mounting holes, and has an axis of sensitivity acting along the second line.

Each of the strain sensing elements is preferably formed by a measurement beam extending perpendicular to the axis of sensitivity of the strain sensing element. A pair of spaced apart, first interconnecting members preferably extend parallel to each other and to the axis of sensitivity of the strain sensing element. The first interconnecting members extend between respective spaced apart locations on one side of the measurement beam to a first portion of the sensor body in which is formed one of the mounting holes through which the axis of sensitivity extends. A pair of spaced apart, second interconnecting members preferably extend parallel to each other and to the axis of sensitivity of the strain sensing element. The second interconnecting members extend between respective spaced apart locations on a side of the measurement beam opposite the first interconnecting members to a second portion of the sensor body in which is formed the other of the mounting holes through which the axis of sensitivity extends. The second interconnecting members are spaced apart from each other by a distance that is greater than the spacing between the first interconnecting members to that the measurement beam bends as the mounting holes move toward and away from each other. A strain transducer is mounted on the measurement beam to measure the strain induced bending of the measurement beam. The measurement beam and the first and second interconnecting members may be integrally formed with each other in the sensor body.

The strain sensor may include a printed circuit board containing electrical components coupled to the strain sensing elements. The printed circuit board is preferably secured to the sensor body. Also, the sensor body (and printed circuit board if included) are preferably enclosed by a protective cover. The strain sensor may be connected to an electronic indicator coupled to the first and second strain sensing elements to provide an indication of the weight of material in a vessel. The strain sensor is preferably mounted on a support structure of a vessel by bolting the sensor to the support structure using threaded holes formed in the support structure. The strain sensor is preferably mounted on the support structure with the first and second mounting holes extending along the principal strain of the support structure, and the second and third mounting holes extending along a line that is perpendicular to the principal strain of the support structure. The location of the threaded holes in the support structure is preferably marked using a drill template so that the mounting holes of the sensor will be precisely aligned with the threaded holes formed in the support structure.

BRIEF DESCRIPTION OF THE DRAWINGS

FIG. 4 is a schematic view of a skirted silo showing drilled and tapped mounting holes for mounting two of the prior art sensors of FIGS. 1–3 in a rosette configuration and for mounting a preferred embodiment of the inventive strain sensor.

FIG. 5 is a schematic view of the portion of FIG. 4 showing mounting holes for the prior art strain sensors mounted on the silo skirt.

FIG. 9 is a detailed schematic view of the portion of FIG. 4 showing mounting holes for the preferred embodiment of the inventive sensor mounted on the silo skirt.

DETAILED DESCRIPTION OF THE INVENTION

Figure 1:
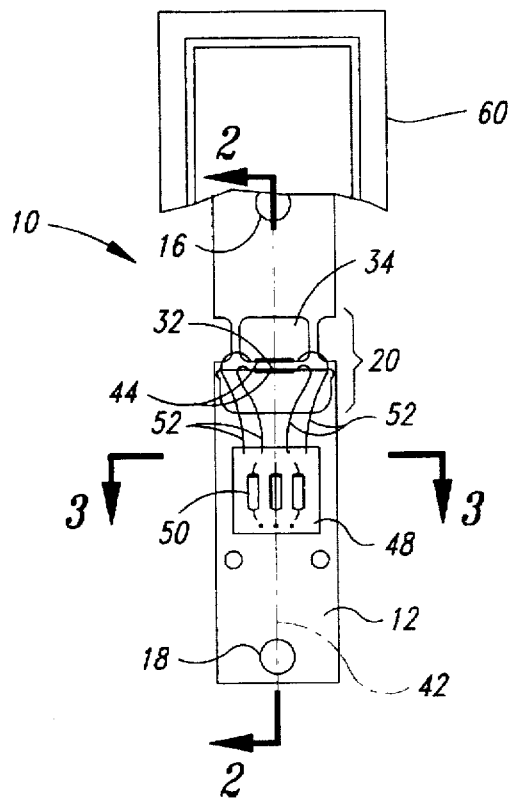
FIG. 1 is front plan view of a prior art bolt-on strain sensor.
Figure 2:
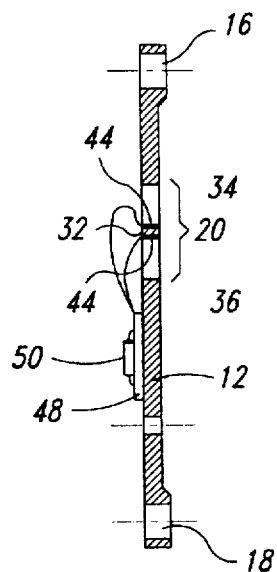
FIG. 2 is a cross-sectional view of the prior art strain sensor of FIG. 1 taken along the line 2—2 of FIG. 1.
Figure 3:
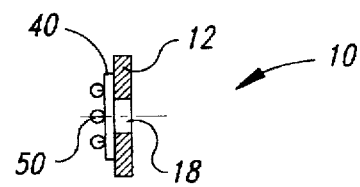
FIG. 3 is a cross-sectional view of the prior art strain sensor of FIG. 1 taken along the line 3—3 of FIG. 1.

A conventional single axis bolt-on strain sensor 10 is illustrated in FIGS. 1–3. The strain sensor 10 includes a sensor body 12 having a pair of spaced apart mounting holes 16, 18 separated from each other by a measurement zone 20. The measurement zone 20 includes an elongated measurement beam 32 connected to a portion of the sensor body 12 containing the mounting hole 16 by a first pair of interconnecting members 34. A second pair of interconnecting members 36 connects the other portion of the measurement body 12 to the opposite side of the measurement beam 32. As is apparent from FIG. 1, the first interconnecting members 32 are separated from each other by a distance that is smaller than the separation of the second interconnecting members 36. Also, all of the interconnecting members 32, 36 are equally spaced from an axis of sensitivity 42 that extends along a line passing through the mounting holes 16, 18. Strain sensing elements 44, such as strain gauges, are mounted on opposite sides of the measurement beam 32. A printed circuit board 48 having a plurality of components 50 mounted thereon is attached to the sensor body 12 adjacent the measurement zone 20. The electrical components 50 are connected to the strain sensing elements 44 by wires 52. The sensor body 12 and all of the components contained thereon are enclosed by a cover 60 secured to the sensor body 12 by suitable means.

In operation, the strain sensor 10 is bolted to a structural support, with the axis of sensitivity 42 extending along the principal axis, and the principal strain occurring in the structural support is imparted to the strain sensor 10 between the mounting holes 16, 18. As the mounting holes 16, 18 move toward and away from each other, the motion is imparted to the measurement beam 32 through the interconnecting members 34, 36 thereby causing the measurement beam 32 to bend in opposite directions responsive to tension and compression, respectively. More particularly, as the mounting holes 16, 18 move toward each other, the center of the measurement beam 32 deflects toward the mounting hole 18. Conversely, as the mounting holes 16, 18 move away from each other, the center of the measurement beam 32 deflects toward the mounting holes 16. The magnitude and direction of the bending of the measurement beam 32 is measured by the strain sensing elements 44 in a conventional manner. The structure and operation of the strain sensor 10 illustrated in FIGS. 1–3 is described in greater detail in U.S. Pat. No. 4,064,744 to Kistler.

The strain sensor 10 of FIGS. 1–3 is used to measure the weight of material in a storage vessel as illustrated in FIG. 4. As illustrated in FIG. 4, a silo 70 contains material that is to be weighed. The silo 70 is supported by a silo support skirt 74 resting on a concrete foundation 76. As the weight of the materials in the silo 70 increases, the compression of the support skirt 74 increases along a principal axis extending in the vertical direction. At the same time, the support skirt 74 expands about a horizontal axis. As the weight of the material in the silo 70 is reduced, the support skirt 74 expands along the vertical principal axis and contracts along the horizontal axis. The prior an strain sensors 10 are mounted on the support skirts 74 at location 80 as best illustrated in FIG. 5. Although a single strain sensor 10 can be used to measure strains induced by changes in the weight of the material, two such sensors 10 are preferably used in a rosette pattern to make the sensing arrangement relatively insensitive to temperature variations.

As illustrated in FIG. 5, the prior art bolt-on strain sensor 10 is installed by forming a pair of threaded holes 82, 84 in the skirt 74 along the vertical axis of the principal axis 86. A pair of threaded holes 90, 92 are also formed in the skirt 74 along the horizontal axis 94. A first prior art bolt-on strain sensor 10 is then secured to the skirt 74 along the principal axis by bolting it to the threaded holes 82, 84. Similarly, a second prior art strain sensor 10 is secured to the skirt 74 by bolting it along the horizontal axis 94 using the threaded holes 90, 92. The holes 82, 84 and 90, 92 are preferably positioned as close as possible to each other so that both strain sensors 10 are exposed to the same thermal effects. However, because of the size of the strain sensors 10, the strain sensors must nevertheless be positioned apart from each other by sufficient distance that they can be exposed to different thermal effects.

Figure 6:
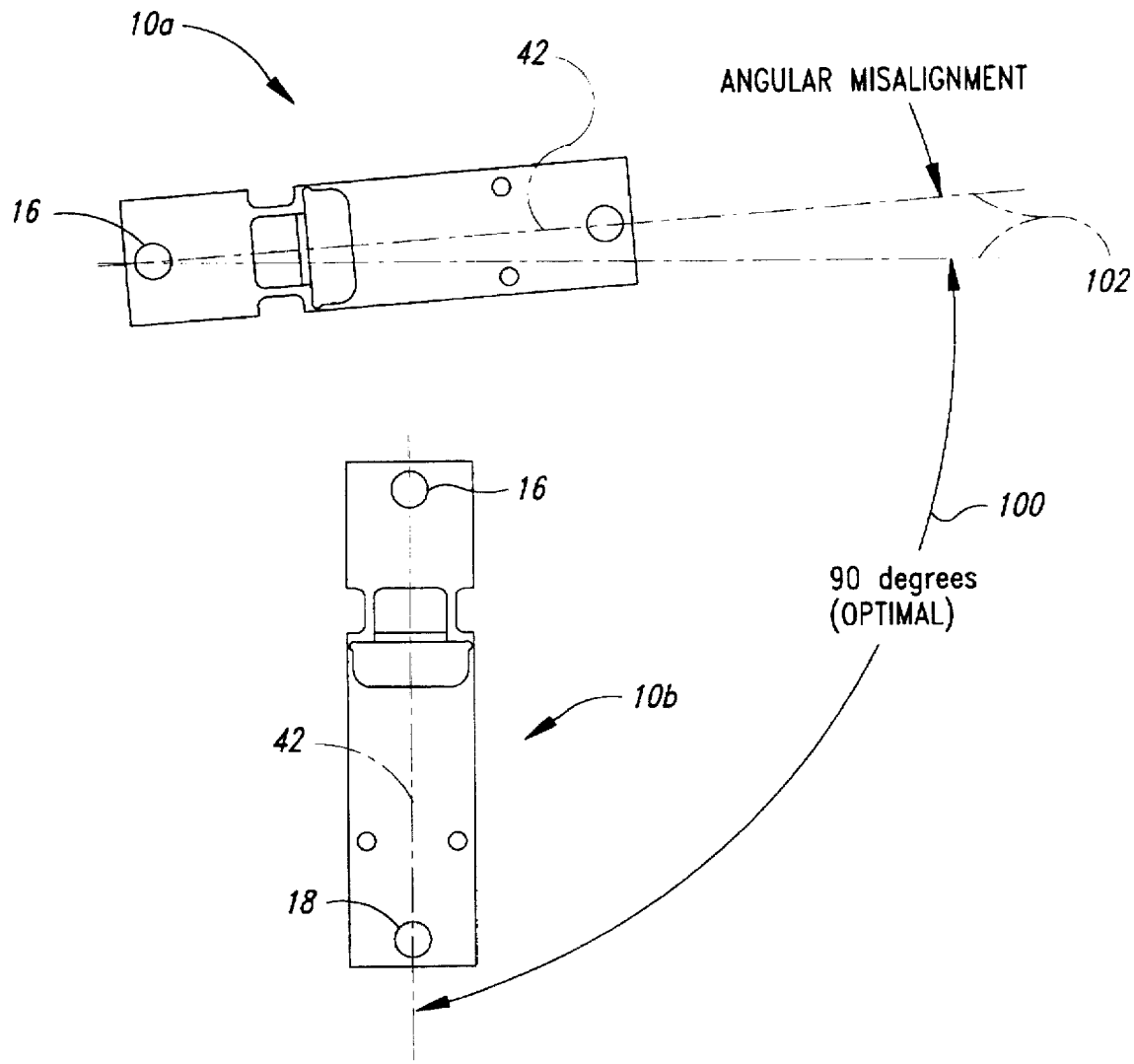
FIG. 6 is a front schematic view illustrating potential misalignment of the prior art sensors mounted in a rosette configuration as shown in FIGS. 4 and 5.

Another problem with mounting the conventional strain sensors 10 in a rosette pattern as shown in FIG. 5 is illustrated in FIG. 6. The strain sensors 10a; 10b are preferably mounted so that the angle 100 between the axis of sensitivity 42 of the sensor 10b and the axis of sensitivity 42 of the sensor 10a is 90°. However, it is sometimes difficult to precisely locate the threaded holes 82, 84, 90, 92 shown in FIG. 5 so that the axis of sensitivity 42 of the sensor 10a is perpendicular to the axis of sensitivity 42 of the sensor 10b. Under these circumstances, an angular misalignment angle 102 exists which can prevent adequate temperature compensation and adversely affect measuring accuracy.

Figures 7, 8:
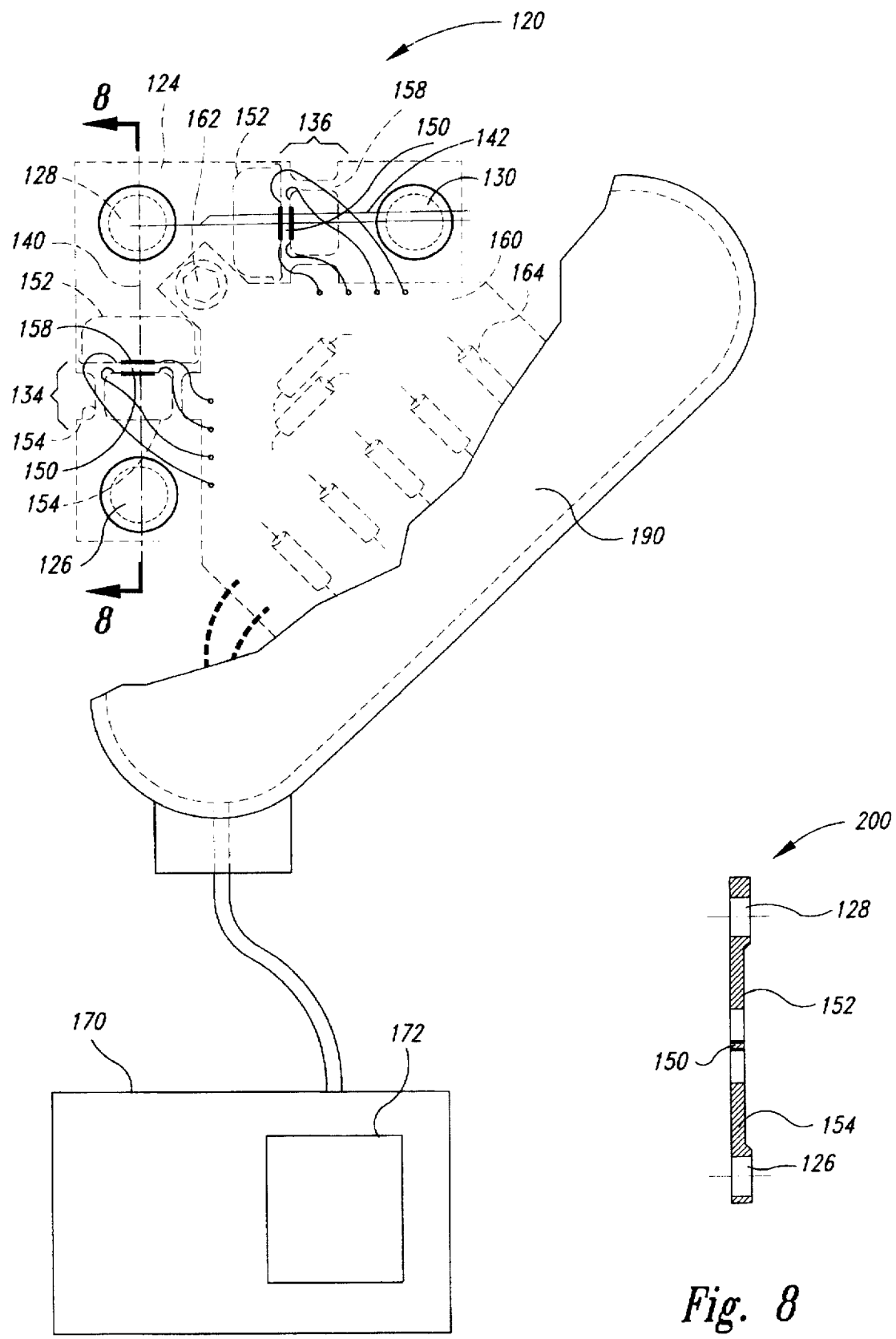
FIG. 7 is a front plan view of a preferred embodiment of the inventive strain sensor.
FIG. 8 is a cross-sectional view of the strain sensor of FIG. 7 taken along the line 8—8 of FIG. 7.

A preferred embodiment of a strain sensor 120 in accordance with the present invention is illustrated in FIGS. 7 and 8. The sensor 120 includes a sensor body 124 of generally L-shaped configuration having mounting holes 126, 130 formed at the end of each leg of the L-shaped body 124 and a common mounting hole 128 formed at the intersection between the legs. A first measurement zone 134 is formed between two of the mounting holes 126, 128 while a second measurement zone 136 is formed in the sensor body 124 between the mounting holes 128, 130. The first measurement zone 134 has an axis of sensitivity 140 extending between the mounting holes 126, 128 while the second strain sensing region 136 has an axis of sensitivity 142 extending between the mounting holes 128, 130. As in the prior art sensor 10 shown in FIGS. 1–3, the measurement zones are formed by a measurement beam 150 connected to the sensor body 124 on opposite sides of the measurement zones 134, 136 by respective pairs of interconnecting members 152, 154. The bending of the measurement beam 150 is sensed by a pair of conventional strain gauges 158. A printed circuit board 160 is secured to the sensor body 124 by a bolt 162 or other fastener. The printed circuit board 160 contains a plurality of electrical components 164 which are connected to each other and to the strain gauges 158 of the measurement beams 150 in a conventional manner. A cover 190 is mounted on the sensor body 124 by suitable means to enclose the sensor body 124 and printed circuit board 160. The components 164 are also connected to a three conductor cable 168 that extends to a measurement device 170 of conventional design having a display window 172 displaying the weight of the material in a vessel.

The sensor 120 of the preferred embodiment has several significant advantages as compared to the prior art strain sensors 10 mounted as shown in FIG. 5. First, because the angle between the axes of sensitivity 140, 142 is fixed by the geometry of the sensor body 124, misalignments of the type illustrated in FIG. 6 cannot occur. Second, because the measurement zone 134 acting along the principal strain is formed from the same sensor body 124 as the measurement zone 136 acting along the horizontal axis, they can be positioned very close to each other. Furthermore, even if one of the measurement zones 134, 136 are exposed to different thermal effects, they nevertheless tend to have the same temperature because of thermal conduction through the sensor body 124. Thus, the preferred embodiment of the sensor 120 illustrated in FIG. 7 not only avoids the misalignment problem discussed above with reference to FIG. 6, but it also avoids the problem of different sensors being exposed to different thermal effects. For these reasons, the sensor 120 is able to provide superior thermal compensation and accuracy as compared to the prior art sensor 10 and mounting techniques illustrated in FIGS. 1–5.

The bolt-on strain sensor 120 is mounted on the skirt 74 of a vessel 70 using the mounting holes illustrated in FIGS. 4 and 9. FIG. 4 shows the placement of the sensor 120 on the skirt 74 while FIG. 9 shows the mounting area 180 in greater detail. With reference to FIG. 9, three threaded holes 182, 184, 186 are formed in the skirt 74 with a line 190 extending between the holes 182, 184 aligned along the vertical, principal strain of the skirt 74. A line 192 extending between the holes 184, 186 extends along a horizontal axis. The holes 182, 186 can be accurately positioned with great ease by simply using a drill template (not shown). Using the sensor body 124 as a template allows the sensor 120 to be installed by simply marking the location of the holes 182, 184, 186 through the mounting holes 126, 128, 130, respectively, when the sensor body 124 is placed against the skirt 74.

Although the inventive sensor has been shown installed on the skirt 74 of a vessel 70, it will be understood that it may be installed on other types of support structures. For example, the sensor 120 could be installed on an I-beam vessel support. In a similar vein, although the sensor 120 is illustrated as using a particular design for the measurement zones 134, 136, it will be understood that other sensor designs may also be used. Also, although mounting holes 126, 128, 130 are preferably formed in the sensor body 124 to allow the sensor 120 to be secured to a support structure by bolts, other fastening means may be used to fasten the sensor body 124 to a support structure at mounting locations positioned on the axis of sensitivity 140, 142. For example, a suitable glue, welding, or other bonding agent placed on the mounting locations might be used.

From the foregoing it will be appreciated that, although specific embodiments of the invention have been described herein for purposes of illustration, various modifications may be made without deviating from the spirit and scope of the invention. Accordingly, the invention is not limited except as by the appended claims.

I claim:

1. A bolt-on strain sensor, comprising:

a sensor body having first, second and third mounting holes, said first and second mounting holes being positioned along a first line and said second and third mounting holes being positioned along a second line that is perpendicular to said first line;

a first strain sensing element mounted on said sensor body between said first and second mounting holes, said first strain sensing element having an axis of sensitivity acting along said first line; and a second strain sensing element mounted on said sensor body between said second and third mounting holes, said second strain sensing element having an axis of sensitivity acting along said second line.

2. The bolt-on strain sensor of claim 1, further including a protective cover enclosing said sensor body and said first and second strain sensing elements.

3. The bolt-on strain sensor of claim 1, wherein each of said strain sensing elements comprise:

a measurement beam extending perpendicular to its axis of sensitivity;

a pair of spaced apart, first interconnecting members extending parallel to each other and to the axis of sensitivity of said strain sensing element, said first interconnecting members extending between respective spaced apart locations on one side of said measurement beam to a first portion of said sensor body in which is formed one of the mounting holes through which said axis of sensitivity extends;

a pair of spaced apart, second interconnecting members extending parallel to each other and to the axis of sensitivity of said strain sensing element, said second interconnecting members extending between respective spaced apart locations on a side of said measurement beam opposite said first interconnecting members to a second portion of said sensor body in which is formed the other of the mounting holes through which said axis of sensitivity extends, said second interconnecting members being spaced apart from each other by a distance that is greater than the spacing between said first interconnecting members; and a strain transducer mounted on said measurement beam.

4. The bolt-on strain sensor of claim 3, wherein said measurement beam and said first and second interconnecting members are integrally formed in said sensor body.

5. The bolt-on strain sensor of claim 1, further comprising a printed circuit board containing electrical components, said printed circuit board being secured to said sensor body and being coupled to said strain sensing elements.

6. The bolt-on strain sensor of claim 1, wherein said sensor body has an L-shaped configuration, and wherein said first and third mounting holes are symmetrically positioned at the ends of respective L-shaped legs of said sensor body, and wherein said second mounting hole is positioned at the intersection of said legs.

7. A system adapted for providing an indication of the weight of material in a vessel supported through a support structure, said support structure having a principal strain along which said support structure is strained, with a magnitude corresponding to the weight of material in said vessel, said system comprising:

a sensor body having first, second and third mounting locations, said first and second mourning locations being positioned along a first line and said second and third mounting locations being positioned along a second line that is perpendicular to said first line;

a first strain sensing element mounted on said sensor body between said first and second mounting locations, said first strain sensing element having an axis of sensitivity acting along said first line;

a second strain sensing element mounted on said sensor body between said second and third mounting locations, said second strain sensing element having an axis of sensitivity acting along said second line;

a fastener adopted to secure said sensor body to said support structure through said mounting locations with said first line extending parallel to the principal strain of said support structure and said second line extending perpendicular to the principal strain of said support structure; and an electronic indicator coupled to said first and second strain sensing elements, said electronic indicator providing said indication of the weight of material in said vessel responsive to electrical signals received from said first and second strain sensing elements.

8. The weighing system of claim 7, further including a protective cover enclosing said sensor body and said first and second strain sensing elements.

9. The weighing system of claim 7, wherein each of said strain sensing elements comprise:

a measurement beam extending perpendicular to its axis of sensitivity;

a pair of spaced apart, first interconnecting members extending parallel to each other and to the axis of sensitivity of said strain sensing element, said first interconnecting members extending between respective spaced apart locations on one side of said measurement beam to a first portion of said sensor body in which is formed one of the mounting holes through which said axis of sensitivity extends;

a pair of spaced apart, second interconnecting members extending parallel to each other and to the axis of sensitivity of said strain sensing element, said second interconnecting members extending between respective spaced apart locations on a side of said measurement beam opposite said first interconnecting members to a second portion of said sensor body in which is formed the other of the mounting holes through which said axis of sensitivity extends, said second interconnecting members being spaced apart from each other by a distance that is greater than the spacing between said first interconnecting members; and a strain transducer mounted on said measurement beam.

10. The weighing system of claim 9, wherein said measurement beam and said first and second interconnecting members are integrally formed in said sensor body.

11. The weighing system of claim 7, further comprising a printed circuit board containing electrical components, said printed circuit board being secured to said sensor body and being coupled between said strain sensing elements and said electronic indicator.

12. The weighing system of claim 7, wherein said mounting locations comprise respective mounting holes formed in said sensor body.

13. The weighing system of claim 12, wherein said sensor body has an L-shaped configuration, and wherein said first and third mounting holes are symmetrically positioned at the ends of respective L-shaped legs of said sensor body, and wherein said second mounting hole is positioned at the intersection of said legs.

14. A method of determining the weight of material in a vessel supported through a support structure, said support structure having a principal strain along which said support structure is strained with a magnitude corresponding to the weight of material in said vessel, said method comprising:

providing a strain sensor having first, second and third mounting locations, said first and second mounting locations positioned along a first line and said second and a third mounting locations positioned along a second line that is perpendicular to said first line, said sensor generating an output signal that increases toward one polarity responsive to said first and second mounting locations moving toward each other and said second and third mounting locations moving away from each other, said sensor generating an output signal that increases toward the opposite polarity responsive to said first and second mounting locations moving away from each other and said second and third mounting locations moving toward each other;

mounting said strain sensor on said support structure at said mounting locations with said first and second mounting locations extending along a line that is parallel to the principal strain of said support structure, and said second and third mounting locations extending along a line that is perpendicular to the principal strain of said support structure; and determining the weight of material in said vessel as a function of the output signal of said strain sensor.

15. The method of claim 14, wherein said mounting locations comprise mounting holes.

16. The method of claim 15, wherein said step of mounting said strain sensor to said support structure comprises:

forming first, second, and third threaded holes in said support structure with said first and second threaded holes extending along a line that is parallel to the principal strain of said support structure, and said second and third threaded holes extending along a line that is perpendicular to the principal strain of said support structure; and placing first, second, and third bolts through the first, second, and third mounting holes of said strain sensor, respectively, and threading said first, second, and third bolts into the first, second, and third threaded holes formed in said mounting structure, respectively.

17. The method of claim 16 wherein said step of forming first, second, and third threaded holes in said support structure comprises:

placing said strain sensor adjacent said support structure in the position it will be mounted on said support structure;

marking the location of said first, second, and third threaded holes through said first, second, and third mounting holes, respectively; and forming threaded holes in the marked locations on said support structure.

* * * * *